Jan. 3, 1961  H. GANGER  2,967,028
JET-PROPELLED AIRPLANE
Filed May 14, 1959  2 Sheets-Sheet 1
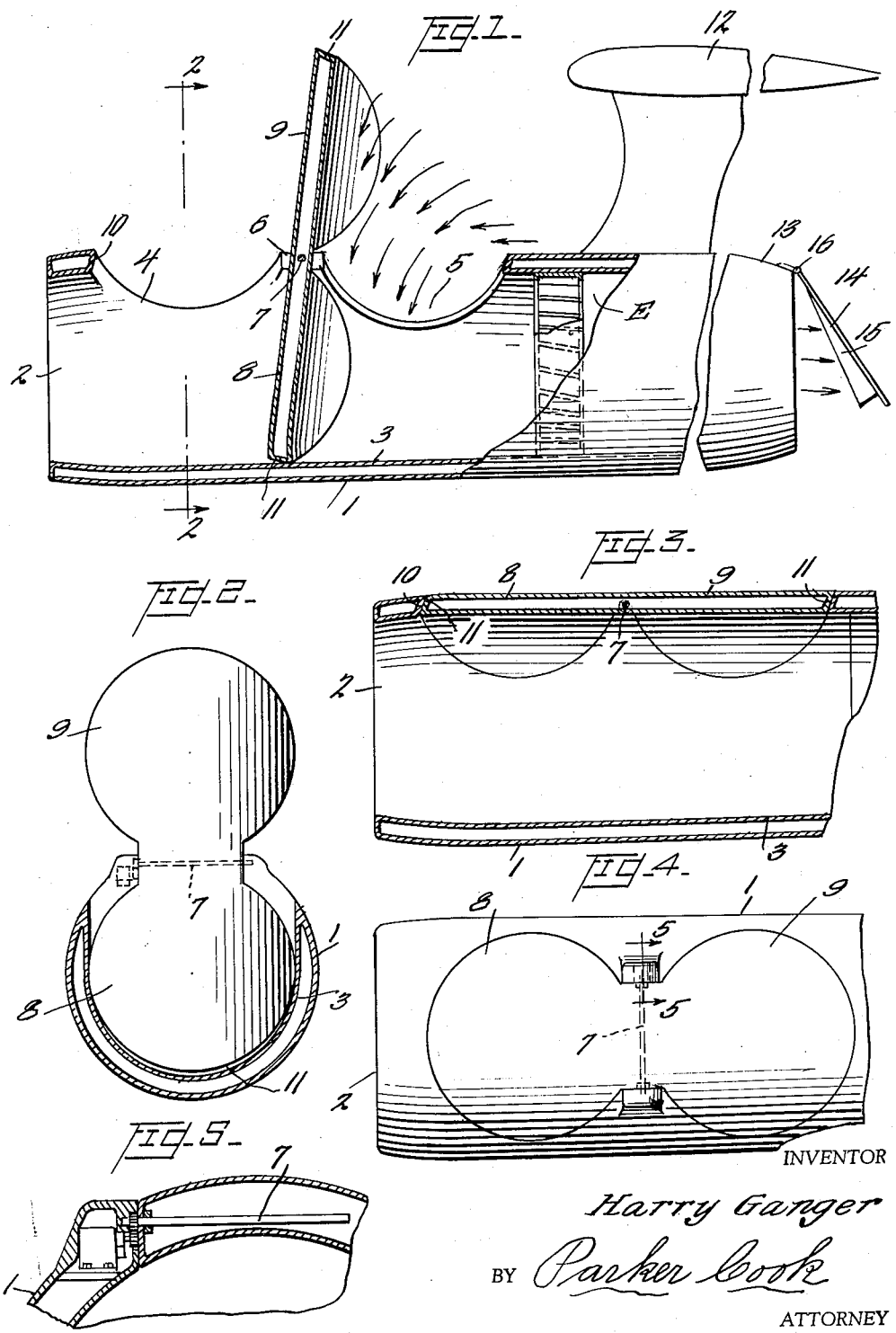
INVENTOR
*Harry Ganger*
BY *Parker Cook*
ATTORNEY Jan. 3, 1961 H. GANGER 2,967,028
JET-PROPELLED AIRPLANE
Filed May 14, 1959 2 Sheets-Sheet 2
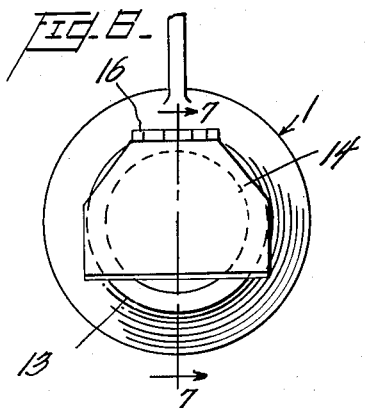
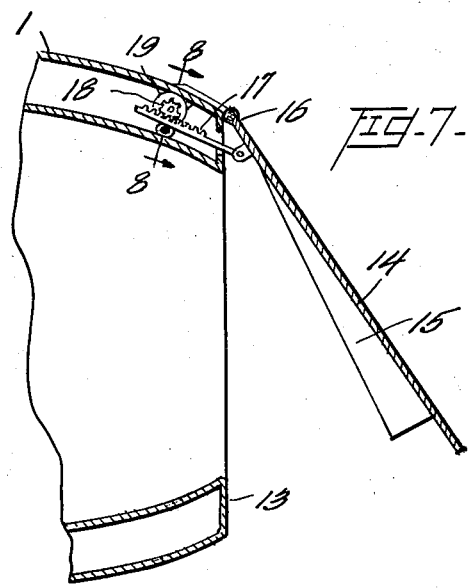
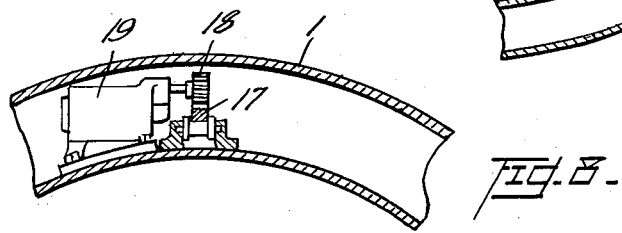
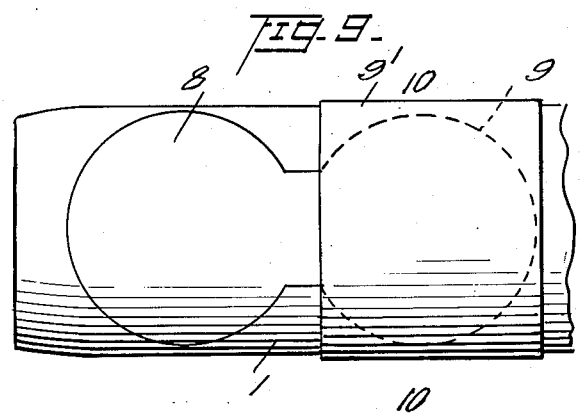
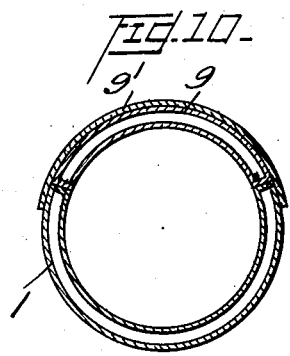
INVENTOR
*Harry Ganger,*
BY *Parker Cook*
ATTORNEY _United States Patent Office_

2,967,028
Patented Jan. 3, 1961

2,967,028

JET-PROPELLED AIRPLANE

Harry Ganger, 168 S. Maryland Ave., Atlantic City, N.J.

Filed May 14, 1959, Ser. No. 813,186

4 Claims. (Cl. 244—12)

My invention relates to a new and useful improvement in jet-propelled airplanes and has for an object to provide a manually or electrically operated butterfly valve in the main air intake and to provide a manually or electrically operated baffle that will extend over the exhaust of the jet engine, whereby the airplane may be air-borne in a much shorter time than the conventional jet-propelled plane, thus not necessitating nearly so long a runway as the runways now in use.

Another object of the invention is to provide a jet-propelled airplane wherein the main air intake to the jet engine may be partly cut off of wholly cut off by a valve, but allowing the air to enter through a secondary opening in the top of the casing of the engine behind the valve so that the air will be drawn in from a vertical direction rather than in a horizontal direction, and thus give greater additional lift to the plane.

To stabilize the jet plane and keep the nose from rising at too great an angle before the tail is elevated there is arranged a baffle that extends down over the exhaust of the jet, which can also be regulated so that the jet stream striking the baffle will tend to provide a lift to the tail end of the plane. Thus the one force may be balanced against the other to keep the plane in a stable or horizontal position.

Another object of the invention is to provide a jet-propelled plane having a butterfly valve in the air intake, which butterfly valve is also provided with what I term a saddle, which in turn is to fit over an opening or secondary inlet in the top of the casing of the engine but to the rear of the butterfly so that when the butterfly valve is closed the saddle will be raised to let the air be drawn through the opening behind the butterfly, which as the plane moves forward, will be drawn in at an angle varying from nearly a 45° angle towards a vertical position, depending on the speed of the plane, which action I believe will retard the plane when coming in for a landing.

Both the butterfly valve with its attached saddle and the baffle will be manually or electrically operated so that the pilot can keep the plane in balance both in its takeoff, while flying, and in its landing.

Another object of the invention is to provide a plane wherein the air intake may be fully closed, fully open, or partly closed or open, so that air sufficient for the jet engine will be drawn in from behind the butterfly to thus add to the lift; and this drawn-in air together with the combustible mixture will act as a reservoir to give greater thrust at the exhaust of the engine.

With these and other objects in view the invention consists in certain new and novel arrangements and combination of parts as will be hereinafter more fully described and pointed out in the claims.

Referring now to the drawings, showing a preferred and a slightly modified form:

Fig. 1 is a side elevation of the casing about a jet engine, showing the butterfly valve in its closed position, together with the saddle on the butterfly valve being in its open position, and showing a portion of a wing and the baffle plate at the exhaust end of the jet casing, Fig. 2 is a fragmentary, sectional view taken on line 2—2 of Fig. 1, Fig. 3 is a fragmentary, sectional view, showing the butterfly valve in its open position and the saddle in its closed position, Fig. 4 is a fragmentary, top plan view with the butterfly valve in its open position and the saddle in its closed position, Fig. 5 is a fragmentary, sectional view, taken on line 5—5 of Fig. 4, Fig. 6 is a rear end view of the baffle plate over the exhaust of the jet engine, Fig. 7 is an enlarged, sectional view taken on line 7—7 of Fig. 6, Fig. 8 is a sectional view taken on line 8—8 of Fig. 7, Fig. 9 is a slight modification, where the saddle has an extra plate to provide greater resistance to the air flow above the engine, and Fig. 10 is a sectional view taken on line 10—10 of Fig. 9.

Referring now to the drawings and more particularly to Fig. 1, there is shown the housing or nacelle 1 of a jet engine, having a main air intake 2. This housing or nacelle 1 is generally made up of double-thickness walls 3 which are slightly spaced apart (as may be seen in a broken-away portion in Fig. 1).

In the forward end of the casing or nacelle 1, I have shown a curved cut-out portion 4, and it is to be remembered that this casing or nacelle 1 is cylindrical in form. Also, slightly to the rear of this cut-out portion 4 is the further cut-away portion or secondary air intake 5. The wall space 6 between these cut-away portions 4 and 5 in the forward end of the casing 1 supports an axle or rod 7 (see Fig. 5) on which is mounted a butterfly valve 8 which has an upper extension 9, which I term as the saddle.

The cut-out portion 4 at its upper edge as at 10 is slightly tapered and the butterfly valve 8, which is concave as viewed from the front, is slightly tapered as at 11 to fit the taper in the edge 10 of the cut-out portion 4.

The saddle 9 is slightly convex as viewed from the front and its upper edges are slightly tapered as at 11 to fit a similar taper in the cut-out portion or secondary air intake 5 so that when the butterfly valve 8 is in the position shown in Fig. 3, that is, in its open position, it will fit in the cut-away portion 4; and likewise the saddle 9 will fit snugly within the cut-out or secondary air intake 5.

There is also shown a portion of an airplane's wings 12, the jet engine E being supported beneath the wing in this instance. Shown at the tail end 13 of the housing 1 may be seen a pivotally mounted baffle 14 with its attached rudder 15, as may be more clearly seen in Figs. 6 and 7.

Referring now for the moment to Figs. 6, 7 and 8, the baffle plate 14 and its rudder 15 centrally of its width are pivoted, as before mentioned, as at 16; while attached to the baffle plate 14 is the rack bar 17, which in turn is engaged by the pinion 18, which is in turn to be driven by an electric motor 19 mounted within the walls of the housing or nacelle 1.

There will be, of course, electrical connections from the motor 19 (not shown) that will permit a desired angularity of the baffle 14; and the smaller the angle the more of the jet stream will be forced against the baffle 14, the idea being that this will add to the lift at this portion of the plane.

In Figs. 9 and 10 there is shown a slight modification of the butterfly valve and the saddle; and in this instance there is an extra plate 9' mounted on the saddle 9 to provide, if desired, a greater wind resistance to the plane when the saddle 9 is in the position as shown in Fig. 1, and to allow for a larger secondary air intake.

It will be understood that this plate 9 is convex, as viewed from Fig. 10, so that it will straddle or saddle the cut-out portion 5 of the casing 1. The cut-out portion 5 should be as large, if not larger, than the main air intake 2 so that the engine E will get as much air when the butterfly valve 8 is closed as when the butterfly valve 8 is open. I also believe that it will make a difference in the stabilization of the plane, depending on the distance that the butterfly valve 8 is ahead of the engine E.

The results that I expect to carry out with the structure shown is as follows: Assuming that the engine has been turned on (and it might be mentioned in passing that if the plane has multiple engines, the arrangement as shown in this one engine will be followed out in the others) and the plane is ready for the takeoff, the butterfly valve 8 will be closed (as shown in Fig. 1), or partially closed, which, of course, will bring the saddle 9 to substantially an upright direction.

Now, the air being cut off from the main air intake 2 will be drawn in from the secondary air intake 5; and the theory is that this drawing in of the air into the jet engine E will cause the nose of the plane to rise much more quickly than if the butterfly valve 8 and the secondary opening 5 were not present.

To stabilize the plane, the baffle 14 will be lowered to assume substantially the position shown in Fig. 1, and the force of the jet stream and its entrained air and combustible mixture will tend to raise the tail end of the plane so that the operator can balance the lift of the nose to agree with the lift of the tail portion to thus keep the plane in a horizontal or stable position when it is air-borne.

After the plane is air-borne, the butterfly valve 8 may be operated so that it will fit up within its opening 4 in the top of the casing 1; and the saddle 9 will lower to cut off the opening or secondary air intake 5, and the baffle 14 may be raised so that the plane is stabilized and propelled in a normal manner.

It will be understood that the secondary air intake or opening 5 must allow as much air to be fed to the jet engine E as if the air had entered through the main air intake 2.

Continuing, I am of the opinion that when desiring to land, the butterfly valve 8 will again be moved to the position as shown in Fig. 1, which will act as a resistance while the plane is moving, and the air striking the saddle 9 will offer some resistance; but principally, the air, as the plane is moving, will be drawn in from a rearward manner, as shown in the arrows, through the secondary air intake 5, which will thus tend to retard the plane; and, as the plane slows down, the air will be taken in from nearly a vertical position, as also shown by the arrows, to thus still provide lift to the plane and let the plane land at a much lower speed than is now possible with jet planes.

It will be understood that other forms of controls for the baffle and the butterfly valve and the saddle may be substituted from that shown in the drawings, the idea being to make these elements function in cooperation with one another so that the plane will be stable and will tend to assume a horizontal position more quickly than the jet-propelled planes in present use, and also permit the plane to land at a much less speed.

Many other slight changes might be made without departing from the spirit and scope of the invention. Having thus described my invention, what I claim is new and desire to secure by Letters Patent is:

1. An airplane consisting in part of an encased jet engine for propelling the same, the casing having a conventional air intake in its nose, a portion of the top of the casing, spaced slightly from the nose, being cut away to form a secondary air intake; a butterfly valve in the nose for controlling the flow of air from said nose through said casing and disposed in front of the secondary air intake, the butterfly valve having an extension in the form of a saddle for closing the secondary air intake when the butterfly valve is in its open position and for uncovering the secondary air intake when the butterfly valve is closed; means for operating the butterfly valve and its saddle so that on a closing of the butterfly valve the intake air will enter from a vertical direction and assist in the upward lift of the nose of the plane.

2. An airplane consisting in part of an encased jet engine for propelling the same, the casing having a conventional air intake in its nose, a portion of the top of the casing, spaced slightly from the nose, being cut away to form a secondary air intake; a butterfly valve in the nose for controlling the flow of air from said nose through said casing and disposed in front of the secondary air intake, the butterfly valve having an extension in the form of a saddle for closing the secondary air intake when the butterfly valve is in its open position and for uncovering the secondary air intake when the butterfly valve is closed; the secondary air intake being of such size that it would admit the same amount of air to the engine as would enter from the conventional air intake had the butterfly valve not been closed; and means for operating the butterfly valve and its saddle so that on a closing of the butterfly valve the air will enter from a vertical direction and assist in the upward lift of the nose of the plane.

3. An airplane consisting in part of an encased jet engine for propelling the same, the casing having a conventional air intake in its nose, a portion of the top of the casing, spaced slightly from the nose, being cut away to form a secondary air intake; a butterfly valve in the nose for controlling the flow of air from said nose through said casing and disposed in front of the secondary air intake, the butterfly valve having an extension in the form of a saddle for closing the secondary air intake when the butterfly valve is in its open position and for uncovering the secondary air intake when the butterfly valve is closed; the butterfly valve, when in the closed position and viewed through said conventional intake, being slightly concave; the secondary air intake being of such size that it would admit the same amount of air to the engine as would enter from the conventional air intake had the butterfly valve not been closed; and means for operating the butterfly valve and its saddle so that on a closing of the butterfly valve the air will enter from a vertical direction and assist in the upward lift of the nose of the plane.

4. A jet-propelled airplane including in part a nacelle for the engine having a conventional air intake in its nose and a secondary air intake opening upwardly and spaced behind the nose; means spaced between the two air intakes for closing the conventional air intake and simultaneously opening the secondary air intake to add additional lift to the nose of the plane; a baffle plate secured to the nacelle and extending into the path of the jet exhaust; means for operating the first-mentioned means; and means for regulating the angularity of the baffle to provide additional lift to the tail of the plane to balance the force of the lift of the tail of the plane with respect to the force of the additional lift of the nose of the plane.

References Cited in the file of this patent

UNITED STATES PATENTS 2,654,552   Jonas _____ Oct. 6, 1953
2,734,698   Straayer _____ Feb. 14, 1956